Sept. 11, 1928.
H. W. HEITMILLER
TROLLING SPOON
Filed March 2, 1927
1,683,890
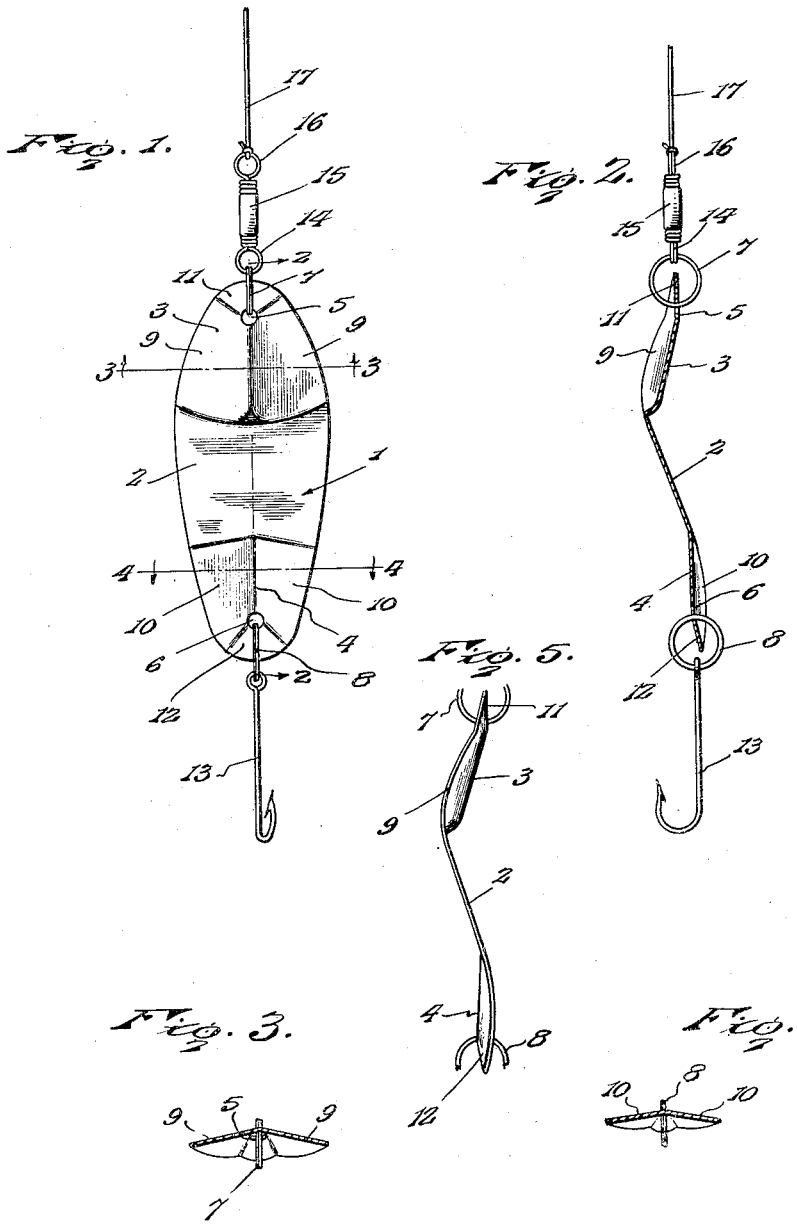
Inventor
H. W. Heitmiller.
By Lacey & Lacey, Attorneys Patented Sept. 11, 1928.

1,683,890

UNITED STATES PATENT OFFICE.

HERBERT WILLIAM HEITMILLER, OF SEATTLE, WASHINGTON.

TROLLING SPOON.

Application filed March 2, 1927. Serial No. 172,056.

This invention relates to fishing and trapping and more particularly to a trolling spoon employed when casting for bass and other game fish.

One object of the invention is to provide a spoon formed of stamped sheet metal shaped to provide planes or surfaces which will cause the spoon to swing transversely when drawn through the water but prevent it from making a complete revolution. Therefore, the spoon instead of having the rotary motion of a spinner will have an oscillatory motion very closely resembling the motion of a herring or a wounded minnow.

The invention is illustrated in the accompanying drawing, wherein

Figure 1 is a top plan view of a spoon hook provided with the improved spoon;

Fig. 2 is a longitudinal section taken on the line 2—2 of Fig. 1;

Fig. 3 is a transverse sectional view taken through the forward portion of the spoon on the line 3—3 of Fig. 1;

Fig. 4 is a transverse sectional view through the rear portion of the spoon taken on the line 4—4 of Fig. 1, and Fig. 5 is a view showing the spoon in side elevation.

The trolling spoon constituting the subject-matter of this invention and indicated in general by the numeral 1 is formed of stamped sheet metal which is bent transversely in spaced relation to its forward and rear ends to provide an intermediate section 2 and forward and rear sections 3 and 4. The intermediate section 2 is flat and extends in a single plane throughout its width and length and is disposed diagonally between the front and rear sections at such angle of relation thereto that, when the spoon is being drawn through the water, the rear section will be disposed substantially horizontal, the intermediate section at a downward incline forwardly therefrom and the forward section extend upwardly from the intermediate section. Openings 5 and 6 are formed adjacent the forward and rear ends of the spoon to receive the open rings 7 and 8 and the forward and rear sections are bent longitudinally between the openings and the intermediate section to provide the front and rear sections with side portions 9 and 10. The side portions 9 of the front section extend downwardly in diverging relation to each other, whereas the side portions 10 of the rear section extend upwardly in diverging relation to each other, as clearly shown in Fig. 2. Therefore, the front and rear sections will be formed with planes or surfaces extending in opposite directions and so disposed in relation to each other that, when the spoon is drawn through the water, it will first be caused to swing upwardly toward one side and then swing downardly and upwardly in the opposite direction. Therefore, the spoon will move through an arc of approximately one hundred and eighty degrees as it is drawn through the water but will not perform a complete revolution and instead of acting as a spinner it will move with a wobbling motion closely resembling the motion of a herring or a wounded minnow and form a very attractive lure for game fish. It should be further noted that, when the front and rear sections are bent transversely to form the diverging side portions, the forward end of the front section in front of the opening 5 and indicated by the numeral 11 extends horizontally and the rear end portion of the rear section to the rear of the opening 6 is bent to form an upwardly extending lip 12 which is arcuate in cross section and assists in causing the desired rocking motion to be imparted to the spoon. The ring 8 carries one or more hooks 13 and the ring 7 is engaged with the rear eye 14 of a swivel 15 to the front eye 16 of which the fish line 17 is tied.

Having thus described the invention, I claim:

1. A trolling spoon comprising an elongated body having an intermediate section flat throughout the width of the body and inclined downwardly towards its forward end, a rear section extending horizontally from said intermediate section and bent to form upwardly diverging side portions, and a front section extending from said intermediate section at an upward incline and bent longitudinally to form downwardly diverging side portions.

2. A trolling spoon comprising an elongated body bent transversely to provide front, rear and intermediate sections each diverging from the adjoining section, said front and rear sections being bent longitudinally to provide diverging side portions.

3. A trolling spoon comprising an elongated body bent transversely in spaced relation to its ends to provide front, rear and intermediate sections diverging from each other, said front and rear sections being bent longitudinally to provide diverging side portions, the side portions of the front section extending in an opposite direction to the side portions of the rear section.

4. A trolling spoon comprising an elongated strip of material bent transversely to form end sections and an intermediate section connecting said end sections, said sections being disposed diagonally of each other and the end sections extending from the intermediate section in opposite directions and bent longitudinally to provide diverging side portions, the side portions of one end section sloping in an opposite direction to the side portions of the other end section.

5. A trolling spoon comprising an elongated strip of material bent transversely in spaced relation to its ends to form front and rear end sections and an intermediate section extending diagonally between the front and rear sections, the intermediate section extending in an even plane throughout its area and the end sections being each bent longitudinally intermediate its width to provide flat diverging side portions, the side portions of the front sections diverging downwardly and the side portions of the rear section diverging upwardly.

6. A trolling spoon comprising an elongated strip of material bent transversely in spaced relation to its ends to form front and rear end sections and an intermediate section extending diagonally between the front and rear sections, the front section extending from the intermediate section at an upward incline and adjacent its front and bent to provide a horizontally extending lip and the rear section extending horizontally from the intermediate section and adjacent its rear end bent upwardly to form a lip, said front and rear sections being bent longitudinally from their lips to the intermediate section to form diverging side portions, said front section having its side portions diverging downwardly and said rear section having its side portions diverging upwardly.

In testimony whereof I affix my signature.

HERBERT WILLIAM HEITMILLER. [L. S.]